United States Patent
Ilola et al.

(10) Patent No.: US 12,101,457 B2
(45) Date of Patent: Sep. 24, 2024

(54) APPARATUS, A METHOD AND A COMPUTER PROGRAM FOR VOLUMETRIC VIDEO

(71) Applicant: Nokia Technologies Oy, Espoo (FI)

(72) Inventors: Lauri Ilola, Munich (DE); Vinod Kumar Malamal Vadakital, Tampere (FI); Sebastian Schwarz, Unterhaching (DE); Kimmo Roimela, Tampere (FI); Lukasz Kondrad, Munich (DE)

(73) Assignee: Nokia Technologies Oy, Espoo (FI)

( * ) Notice: Subject to any disclaimer, the term of this patent is extended or adjusted under 35 U.S.C. 154(b) by 85 days.

(21) Appl. No.: 17/789,629

(22) PCT Filed: Dec. 7, 2020

(86) PCT No.: PCT/FI2020/050818
§ 371 (c)(1),
(2) Date: Jun. 28, 2022

(87) PCT Pub. No.: WO2021/136876
PCT Pub. Date: Jul. 8, 2021

(65) Prior Publication Data
US 2023/0050860 A1 Feb. 16, 2023

(30) Foreign Application Priority Data
Jan. 2, 2020 (FI) ...................................... 20205001

(51) Int. Cl.
*G06T 15/04* (2011.01)
*G06T 5/80* (2024.01)
(Continued)

(52) U.S. Cl.
CPC ............ *H04N 13/388* (2018.05); *G06T 5/80* (2024.01); *G06T 15/04* (2013.01); *G06T 17/20* (2013.01); *H04N 19/597* (2014.11); *H04N 19/70* (2014.11)

(58) Field of Classification Search
CPC .............................. G06T 15/04; H04N 13/388
See application file for complete search history.

(56) References Cited

U.S. PATENT DOCUMENTS

| 7,009,620 B2 * | 3/2006 | Horton | G06T 15/04 382/285 |
| 2013/0162633 A1 * | 6/2013 | Berger | G09G 5/00 345/582 |

(Continued)

FOREIGN PATENT DOCUMENTS

| EP | 3543958 A1 | 9/2019 |
| WO | 2019/143486 A1 | 7/2019 |
| WO | WO-2019/243663 A1 | 12/2019 |

OTHER PUBLICATIONS

"Information technology-Coded Representation of Immersive Media-Part 5: Video-based Point Cloud Compression", ISO/IEC JTC1/SC29/WG11, ISO/IEC 23090-5, 2019, 102 pages.

(Continued)

*Primary Examiner* — Yi Yang
(74) *Attorney, Agent, or Firm* — Harrington & Smith

(57) ABSTRACT

A method comprising: providing a 3D representation of at least one object as an input for an encoder (500); projecting the 3D representation onto at least one 2D patch (502); generating at least a geometry image and a texture image from the 2D patch (504); generating, based on the geometry image, a mesh comprising a number of vertices (506); mapping the number of vertices to two-dimensional (2D) coordinates of the texture image (508), and signalling said (Continued)

2D coordinates of the texture image to be applied to the number of vertices of the mesh in or along a bitstream (510).

20 Claims, 7 Drawing Sheets

(51) Int. Cl.
    *G06T 17/20*         (2006.01)
    *H04N 13/388*     (2018.01)
    *H04N 19/597*     (2014.01)
    *H04N 19/70*      (2014.01)

(56) References Cited

U.S. PATENT DOCUMENTS

| | | |
|---|---|---|
| 2017/0124761 A1 | 5/2017 | Michel et al. |
| 2018/0253867 A1* | 9/2018 | Laroche .................. G06T 17/20 |
| 2019/0012842 A1* | 1/2019 | Chaudhary ........... G06T 17/205 |
| 2019/0110041 A1* | 4/2019 | Cole .................... H04N 13/194 |
| 2019/0114822 A1 | 4/2019 | Cernigliaro et al. |
| 2019/0122393 A1* | 4/2019 | Sinharoy .................. G06T 7/73 |
| 2019/0164351 A1 | 5/2019 | Kim et al. |

OTHER PUBLICATIONS

"Polygon Mesh", Wikipedia, Retrieved on Jun. 16, 2022, Webpage available at : https://en.wikipedia.org/wiki/Polygon_mesh.

"Attribution-ShareAlike 3.0 Unported (CC BY-SA 3.0)", Creative Commons, Retrieved on Jun. 16, 2022, Webpage available at : https://creativecommons.org/licenses/by-sa/3.0/.

Zakharchenko, "V-PCC Codec description", 3DG, ISO/IEC JTC1/SC29/WG11 MPEG2018/N18017, Oct. 2018, 32 pages.

Faramarzi et al., "[V-PCC] EE2.6 Report on mesh coding with V-PCC", Samsung Electronics, ISO/IEC JTC1/SC29/ WG11 MPEG2019/m49588, Jul. 2019, 7 pages.

"Google Draco", Github, Retrieved on Jun. 16, 2022, Webpage available at : https://github.com/google/draco.

"Information Technology—Dynamic Adaptive Streaming over HTTP (DASH)—Part 1: Media Presentation Description and Segment Formats", ISO/IEC 23009-1, Second Edition, May 15, 2014, 152 pages.

Office action received for corresponding Finnish Patent Application No. 20205001, dated Sep. 9, 2020, 10 pages.

"V-PCC Codec Description", 3DG, ISO/IEC JTC1/SC29/WG11 N18674, Sep. 16, 2019, 59 pages.

Schwarz et al., "2D Video Coding of Volumetric Video Data", Picture Coding Symposium (PCS), Jun. 24-27, 2018, pp. 61-65.

International Search Report and Written Opinion received for corresponding Patent Cooperation Treaty Application No. PCT/FI2020/050818, dated Apr. 19, 2021, 17 pages.

Rhyu et al., "International Organisation for Standardisation Organisation Internationale De Normalisation Iso/Iec JTC1/SC29/WG11CODING of Moving Pictures and Audio", ISO/IEC JTC1/SC29/WG11 m47608 Samsung electronics, Mar. 2019, pp. 1-3.

"Working Draft 2 of Metadata for Immersive Video", ISO/IEC JTC 1/SC 29/WG11, N18576, Video, Approved WG11 Document, Aug. 6, 2019, 37 pages.

"G-PCC Future Enhancements", ISO/IEC 23090-9, N18837, Dec. 23, 2019, 131 pages.

\* cited by examiner 102400  25600  6400  1600  400

APPARATUS, A METHOD AND A COMPUTER PROGRAM FOR VOLUMETRIC VIDEO

RELATED APPLICATION

This application was originally filed as PCT Application No. PCT/FI2020/050818, filed on Dec. 7, 2020, which claims priority from Finish Application No. 20205001, filed on Jan. 2, 2020, each of which is incorporated herein by reference in its entirety.

TECHNICAL FIELD

The present invention relates to an apparatus, a method and a computer program for volumetric video coding.

BACKGROUND

Volumetric video data represents a three-dimensional scene or object and can be used as input for virtual reality (VR), augmented reality (AR) and mixed reality (MR) applications. Such data describes the geometry, e.g. shape, size, position in three-dimensional (3D) space, and respective attributes, e.g. colour, opacity, reflectance and any possible temporal changes of the geometry and attributes at given time instances. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are polygonal meshes, point clouds (PCs), or voxel arrays. In dense point clouds or voxel arrays, the reconstructed 3D scene may contain tens or even hundreds of millions of points. One way to compress a time-varying volumetric scene/object is to project 3D surfaces to some number of pre-defined 2D planes. Regular 2D video compression algorithms can then be used to compress various aspects of the projected surfaces. For example, MPEG Video-Based Point Cloud Coding (V-PCC) provides a procedure for compressing a time-varying volumetric scene/object by projecting 3D surfaces onto a number of pre-defined 2D planes, which may then be compressed using regular 2D video compression algorithms. The projection is presented using different patches, where each set of patches may represent a specific object or specific parts of a scene.

In 3D graphics, polygonal meshes are extensively used. Therefore, V-PCC also provides support for mesh encoding and decoding. Therein, each vertex (i.e. a point in 3D space defining the shape of an object) is mapped with corresponding color values and texture coordinates of the object. Larger number of vertices enables to encode more detailed geometry structure of the object. However, if better compression efficiency is desired by reducing the number of vertices, this would lead to loss of texture details, as well.

SUMMARY

Now, an improved method and technical equipment implementing the method has been invented, by which the above problems are alleviated. Various aspects include a method, an apparatus and a computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided a method comprising providing a 3D representation of at least one object as an input for an encoder; projecting the 3D representation onto at least one 2D patch; generating at least a geometry image and a texture image from the 2D patch; generating, based on the geometry image, a mesh comprising a number of vertices; mapping the number of vertices to two-dimensional (2D) coordinates of the texture image; and signaling said 2D coordinates of the texture image to be applied to the number of vertices of the mesh in or along a bitstream.

An apparatus according to a second aspect comprises at least one processor and at least one memory, said at least one memory stored with computer program code thereon, the at least one memory and the computer program code configured to, with the at least one processor, cause the apparatus at least to perform: provide a 3D representation of at least one object as an input for an encoder; project the 3D representation onto at least one 2D patch; generate at least a geometry image and a texture image from the 2D patch; generate, based on the geometry image, a mesh comprising a number of vertices; map the number of vertices to two-dimensional (2D) coordinates of the texture image; and signal said 2D coordinates of the texture image to be applied to the number of vertices of the mesh in or along a bitstream.

An apparatus according to a third aspect comprises means for providing a 3D representation of at least one object as an input for an encoder; means for projecting the 3D representation onto at least one 2D patch; means for generating at least a geometry image and a texture image from the 2D patch; means for generating, based on the geometry image, a mesh comprising a number of vertices; means for mapping the number of vertices to two-dimensional (2D) coordinates of the texture image; and means for signaling said 2D coordinates of the texture image to be applied to the number of vertices of the mesh in or along a bitstream.

According to an embodiment, the apparatus further comprises means for determining a resolution of the texture image; and means for determining the number of vertices of the mesh, wherein the ratio between the resolution of the texture image and the number of vertices of the mesh is adjustable.

According to an embodiment, said 2D coordinates of the texture image to be applied to the number of vertices of the mesh are configured to be signaled in metadata structures.

According to an embodiment, said 2D coordinates of the texture image are configured to be signaled as V-PCC metadata structures comprising definitions for calculating 2D texture coordinates from vertex coordinates of the geometry image.

According to an embodiment, the signalling of said 2D coordinates of the texture image to be applied to the number of vertices of the mesh is configured to be carried out by at least two syntax elements, a first syntax element defining whether said mapping is used and a second syntax element defining a type of the mapping.

According to an embodiment, the signalling of said 2D coordinates of the texture image to be applied to the number of vertices of the mesh is configured to be included in an atlas sequence parameter set syntax structure.

According to an embodiment, the signalling of said 2D coordinates of the texture image to be applied to the number of vertices of the mesh is configured to be carried out by at least a first syntax element defining whether said mapping is used and a syntax structure defining a list of the mapping types.

According to an embodiment, the signalling of said 2D coordinates of the texture image to be applied to the number of vertices of the mesh is configured to be included patch metadata or in tile group metadata.

According to an embodiment, said 2D coordinates of the texture image to be applied to the number of vertices of the mesh are configured to be signaled as an additional attribute for encoded volumetric data bitstream.

According to an embodiment, a UV attribute map comprising per pixel 2D coordinates of the texture image are configured to be stored on at least two channels of encoded video bitstream.

According to an embodiment, a map comprising said 2D coordinates of the texture image to be applied to the number of vertices of the mesh are encodable with a plurality of values, said values representing at least one per-pixel property.

According to an embodiment, said map is configured to be embedded in an occupancy map.

According to an embodiment, the apparatus further comprises means for providing a signal for controlling a decoder not to scale up one or more of the encoded video component streams.

According to an embodiment, said signalling is configured to be performed by a flag in one or more of the following: occupancy information, geometry information, attribute information.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which:

FIGS. 7a-7c show examples of UV coordinate maps being encodable with a plurality of values according to some embodiments.

DETAILED DESCRIPTION OF SOME EXAMPLE EMBODIMENTS

Figure 1A:
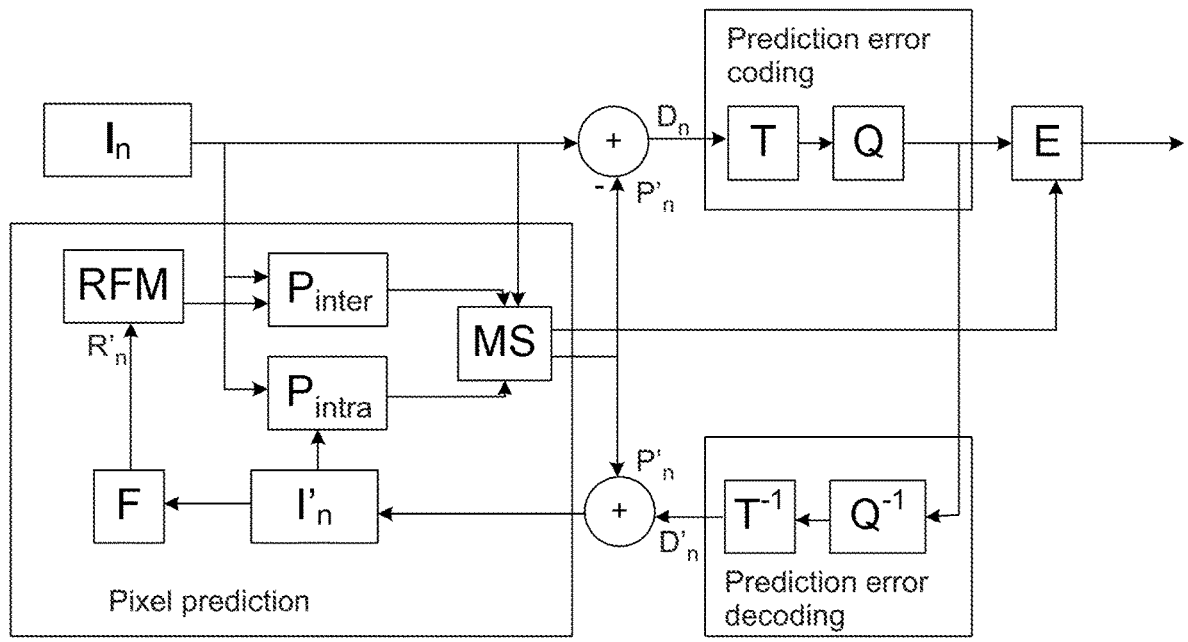
FIGS. 1a and 1b show an encoder and a decoder for encoding and decoding 2D pictures.

In the following, several embodiments will be described in the context of polygon meshes in volumetric video coding. It is to be noted, however, that the embodiments are not limited to specific scene models or specific coding technologies.

A video codec comprises an encoder that transforms the input video into a compressed representation suited for storage/transmission, and a decoder that can un-compress the compressed video representation back into a viewable form. An encoder may discard some information in the original video sequence in order to represent the video in a more compact form (i.e. at lower bitrate).

Volumetric video may be captured using one or more three-dimensional (3D) cameras. When multiple cameras are in use, the captured footage is synchronized so that the cameras provide different viewpoints to the same world. In contrast to traditional 2D/3D video, volumetric video describes a 3D model of the world where the viewer is free to move and observer different parts of the world.

Volumetric video enables the viewer to move in six degrees of freedom (6DOF): in contrast to common 360° video, where the user has from 2 to 3 degrees of freedom (yaw, pitch, and possibly roll), a volumetric video represents a 3D volume of space rather than a flat image plane. Volumetric video frames contain a large amount of data because they model the contents of a 3D volume instead of just a two-dimensional (2D) plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstruction techniques such as structure from motion, or captured with a combination of cameras and depth sensors such as LiDAR (Light Detection and Ranging), for example.

Volumetric video data represents a three-dimensional scene or object, and thus such data can be viewed from any viewpoint. Volumetric video data can be used as an input for augmented reality (AR), virtual reality (VR) and mixed reality (MR) applications. Such data describes geometry (shape, size, position in 3D-space) and respective attributes (e.g. color, opacity, reflectance, . . . ), together with any possible temporal changes of the geometry and attributes at given time instances (e.g. frames in 2D video). Volumetric video is either generated from 3D models, i.e. computer-generated imagery (CGI), or captured from real-world scenes using a variety of capture solutions, e.g. a multi-camera, a laser scan, a combination of video and dedicated depths sensors, etc. Also, a combination of CGI and real-world data is possible. Examples of representation formats for such volumetric data are triangle meshes, point clouds, or voxel. Temporal information about the scene can be included in the form of individual capture instances, i.e. "frames" in 2D video, or other means, e.g. position of an object as a function of time.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications, such as capturing real world 3D scenes where the topology is not necessarily a 2D manifold. Another way to represent 3D data is coding this 3D data as a set of texture and depth map as is the case in the multi-view plus depth. Closely related to the techniques used in multi-view plus depth is the use of elevation maps, and multi-level surface maps.

In 3D point clouds, each point of each 3D surface is described as a 3D point with color and/or other attribute information such as surface normal or material reflectance. Point cloud is a set of data points in a coordinate system, for example in a three-dimensional coordinate system being defined by X, Y, and Z coordinates. The points may represent an external surface of an object in the screen space, e.g. in a three-dimensional space.

In dense point clouds or voxel arrays, the reconstructed 3D scene may contain tens or even hundreds of millions of points. If such representations are to be stored or interchanged between entities, then efficient compression of the presentations becomes fundamental. Standard volumetric video representation formats, such as point clouds, meshes, voxel, suffer from poor temporal compression performance. Identifying correspondences for motion-compensation in 3D-space is an ill-defined problem, as both, geometry and respective attributes may change. For example, temporal successive "frames" do not necessarily have the same number of meshes, points or voxel. Therefore, compression of dynamic 3D scenes is inefficient. 2D-video based approaches for compressing volumetric data, i.e. multiview with depth, have much better compression efficiency, but rarely cover the full scene. Therefore, they provide only limited 6DOF capabilities.

Instead of the above-mentioned approach, a 3D scene, represented as meshes, points, and/or voxel, can be projected onto one, or more, geometries. These geometries may be "unfolded" or packed onto 2D planes (two planes per geometry: one for texture, one for depth), which are then encoded using standard 2D video compression technologies. Relevant projection geometry information may be transmitted alongside the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with highly efficient temporal compression. Thus, coding efficiency can be increased greatly. Using geometry-projections instead of 2D-video based approaches based on multiview and depth, provides a better coverage of the scene (or object). Thus, 6DOF capabilities are improved. Using several geometries for individual objects improves the coverage of the scene further. Furthermore, standard video encoding hardware can be utilized for real-time compression/decompression of the projected planes. The projection and the reverse projection steps are of low complexity.

Figure 1B:
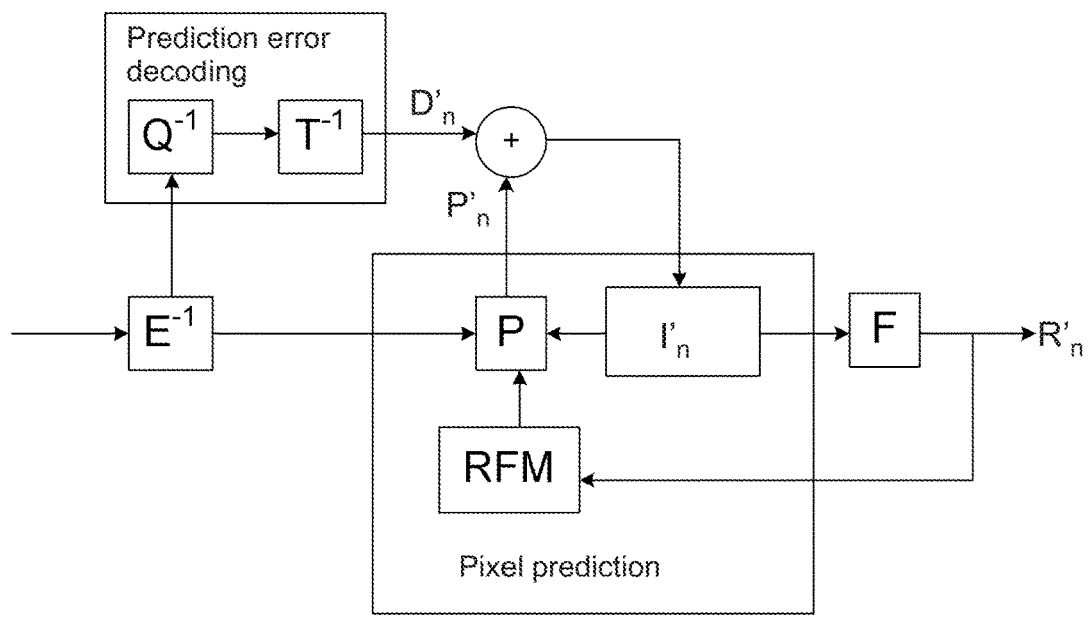

FIGS. 1a and 1b show an encoder and decoder for encoding and decoding the 2D texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 1a. FIG. 1a illustrates an image to be encoded (I"); a predicted representation of an image block (P'"); a prediction error signal (D"); a reconstructed prediction error signal (D'"); a preliminary reconstructed image (I'"); a final reconstructed image (R'"); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F).

An example of a decoding process is illustrated in FIG. 1b. FIG. 1b illustrates a predicted representation of an image block (P'"); a reconstructed prediction error signal (D'"); a preliminary reconstructed image (I'"); a final reconstructed image (R'"); an inverse transform ($T^{-1}$); an inverse quantization ($Q^{-1}$); an entropy decoding ($E^{-1}$); a reference frame memory (RFM); a prediction (either inter or intra) (P); and filtering (F).

Many hybrid video encoders encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate). Video codecs may also provide a transform skip mode, which the encoders may choose to use. In the transform skip mode, the prediction error is coded in a sample domain, for example by deriving a sample-wise difference value relative to certain adjacent samples and coding the sample-wise difference value with an entropy coder.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

A first texture picture may be encoded into a bitstream, and the first texture picture may comprise a first projection of texture data of a first source volume of a scene model onto a first projection surface. The scene model may comprise a number of further source volumes.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (such as a depth picture) may be encoded and decoded with a video codec. This first geometry picture may be seen to represent a mapping of the first projection surface to the first source volume, and the decoder may use this information to determine the location of geometry primitives in the model to be reconstructed. In order to determine the position of the first source volume and/or the first projection surface and/or the first projection in the scene model, there may be first geometry information encoded into or along the bitstream.

An attribute picture may be defined as a picture that comprises additional information related to an associated texture picture. An attribute picture may for example comprise surface normal, opacity, or reflectance information for a texture picture. A geometry picture may be regarded as one type of an attribute picture, although a geometry picture may be treated as its own picture type, separate from an attribute picture.

Texture picture(s) and the respective geometry picture(s), if any, and the respective attribute picture(s) may have the same or different chroma format.

Terms texture image and texture picture may be used interchangeably. Terms geometry image and geometry picture may be used interchangeably. A specific type of a geometry image is a depth image. Embodiments described in relation to a geometry image equally apply to a depth image, and embodiments described in relation to a depth image equally apply to a geometry image. Terms attribute image and attribute picture may be used interchangeably. A geometry picture and/or an attribute picture may be treated as an auxiliary picture in video/image encoding and/or decoding.

Figure 2A:
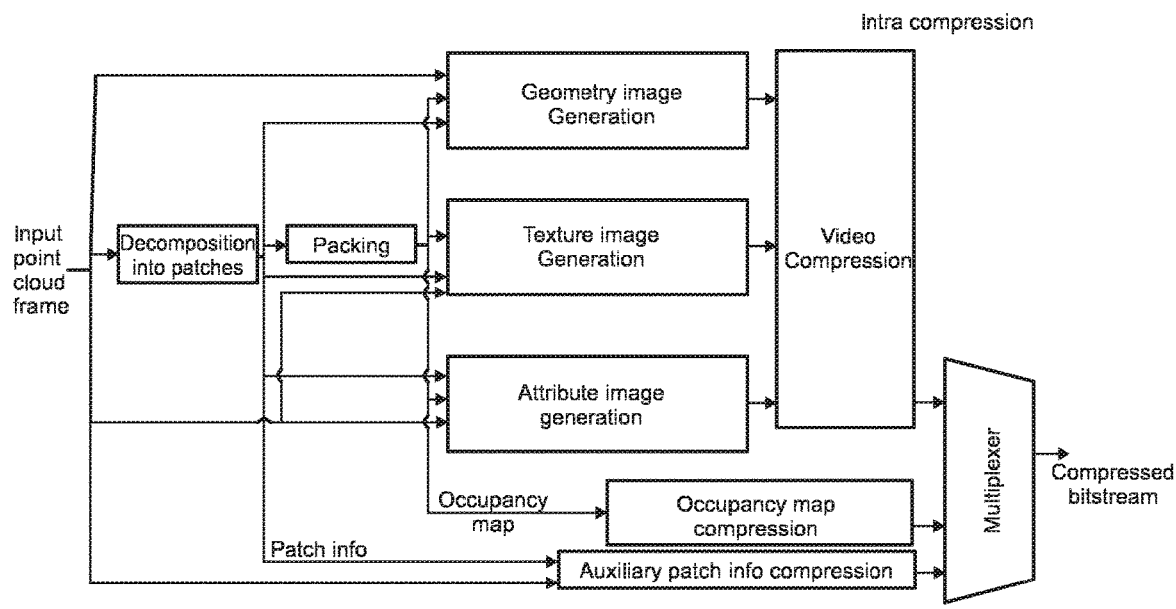
FIGS. 2a and 2b show a compression and a decompression process for 3D volumetric video.
Figure 2B:
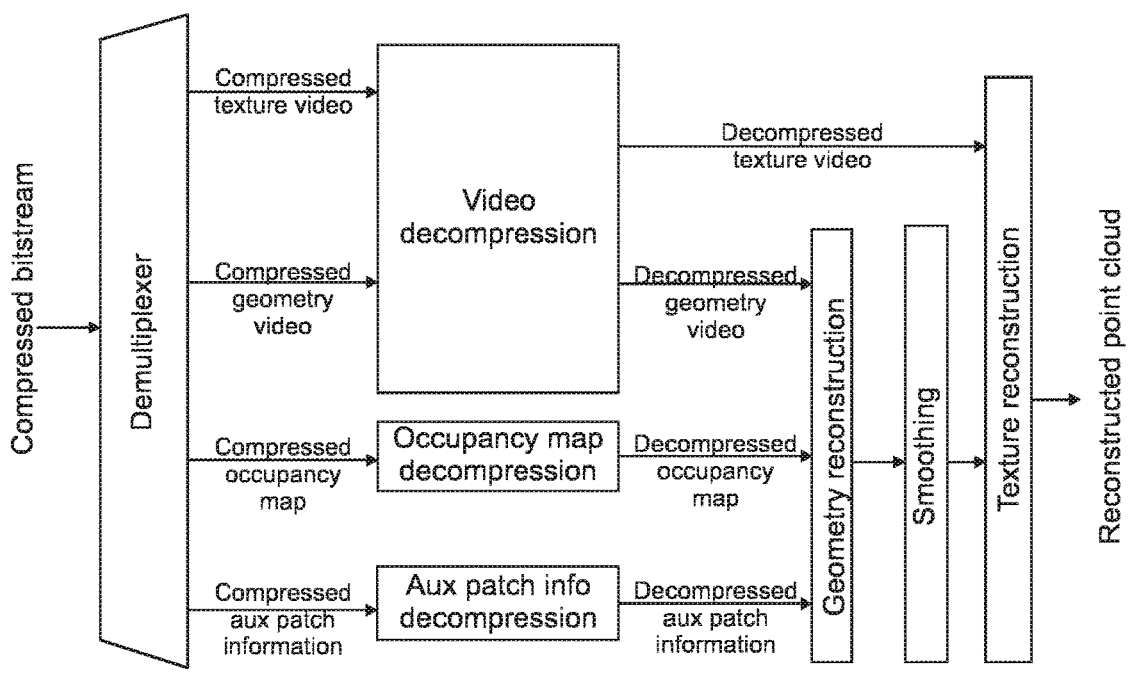

FIGS. 2a and 2b illustrate an overview of exemplified compression/decompression processes. The processes may be applied, for example, in Point Cloud Coding (PCC) according to MPEG standard. MPEG Video-Based Point Cloud Coding (V-PCC), Test Model a.k.a. TMC2v0 (MPEG N18017) discloses a projection-based approach for dynamic point cloud compression. For the sake of illustration, some of the processes related to video-based point cloud compression (V-PCC) compression/decompression are described briefly herein. For a comprehensive description of the model, a reference is made to MPEG N18017.

Figure 3A:
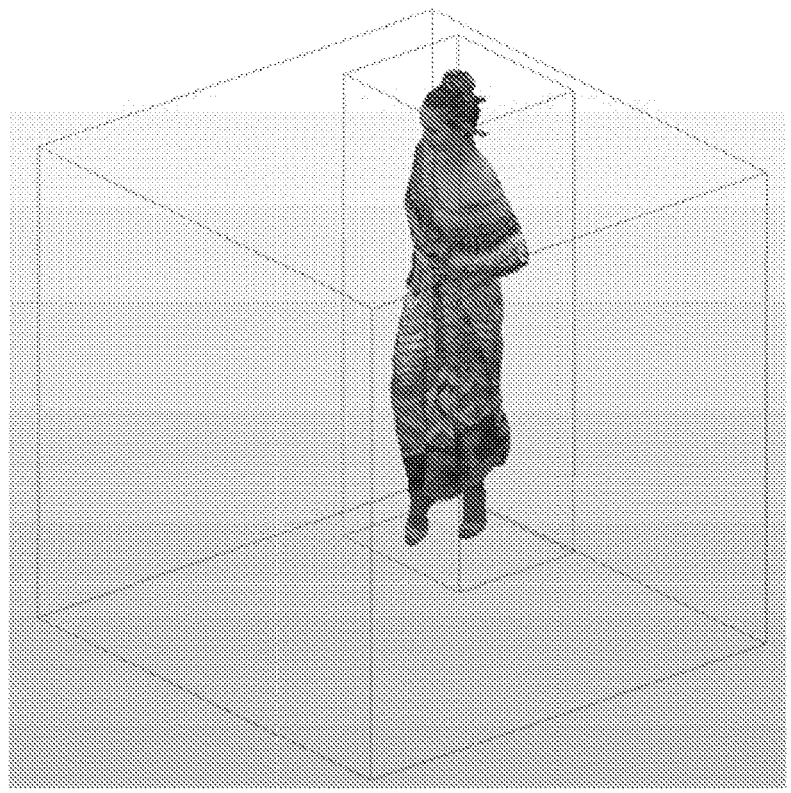
FIGS. 3a and 3b show an example of a point cloud frame and a projection of points to a corresponding plane of a point cloud bounding box.

Each point cloud frame represents a dataset of points within a 3D volumetric space that has unique coordinates and attributes. An example of a point cloud frame is shown on FIG. 3a.

The patch generation process decomposes the point cloud frame by converting 3D samples to 2D samples on a given projection plane using a strategy that provides the best compression. The patch generation process aims at decomposing the point cloud into a minimum number of patches with smooth boundaries, while also minimizing the reconstruction error. In the V-PCC test model TMC2v0, the following approach is implemented.

First, the normal per each point is estimated and the tangent plane and its corresponding normal are defined per each point, based on the point's nearest neighbours m within a predefined search distance. A K-D tree is used to separate the data and find neighbours in a vicinity of a point $p_i$ and a barycenter $c=\bar{p}$ of that set of points is used to define the normal. The barycenter c is computed as follows:

$$c = \bar{p} = \frac{1}{m}\sum_{i=1}^{m}p_i$$

The normal is estimated from eigen decomposition for the defined point cloud as:

$$\sum_{i=1}^{m}(p_i - \bar{p})(p_i - \bar{p})^T$$

Based on this information each point is associated with a corresponding plane of a point cloud bounding box. Each plane is defined by a corresponding normal $\vec{n}_{p_{idx}}$ with values:
(1.0, 0.0, 0.0),
(0.0, 1.0, 0.0),
(0.0, 0.0, 1.0),
(−1.0, 0.0, 0.0),
(0.0, −1.0, 0.0),
(0.0, 0.0, −1.0).

More precisely, each point is associated with the plane that has the closest normal (i.e., maximizes the dot product of the point normal $\vec{n}_{p_i}$ and the plane normal $\vec{n}_{p_{idx}}$.

$$\max_{p_{idx}}\{\vec{n}_{p_i} \cdot \vec{n}_{p_{idx}}\}$$

Figure 3B:
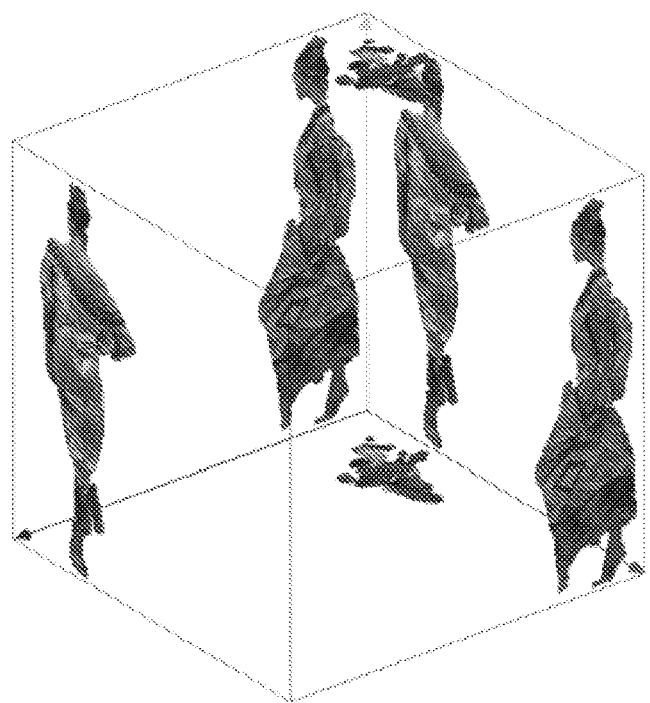

The sign of the normal is defined depending on the point's position in relationship to the "center". The projection estimation description is shown in FIG. 3b.

The initial clustering is then refined by iteratively updating the cluster index associated with each point based on its normal and the cluster indices of its nearest neighbors. The next step consists of extracting patches by applying a connected component extraction procedure.

The packing process aims at mapping the extracted patches onto a 2D grid while trying to minimize the unused space, and guaranteeing that every T×T (e.g., 16×16) block of the grid is associated with a unique patch. Herein, T is a user-defined parameter that is encoded in the bitstream and sent to the decoder.

TMC2v0 uses a simple packing strategy that iteratively tries to insert patches into a W×H grid. W and H are user defined parameters, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current resolution image can fit a patch, then the height H of the grid is temporarily doubled and search is applied again. At the end of the process, H is clipped so as to fit the used grid cells.

The image generation process exploits the 3D to 2D mapping computed during the packing process to store the geometry and texture of the point cloud as images. In order to better handle the case of multiple points being projected to the same pixel, each patch is projected onto two images, referred to as layers. More precisely, let H(u,v) be the set of points of the current patch that get projected to the same pixel (u, v). The first layer, also called the near layer, stores the point of H(u,v) with the lowest depth D0. The second layer, referred to as the far layer, captures the point of H(u,v) with the highest depth within the interval [D0, D0+Δ], where Δ is a user-defined parameter that describes the surface thickness.

The generated videos have the following characteristics: geometry: W×H YUV420-8 bit, where the geometry video is monochromatic, and texture: W×H YUV420-8 bit, where the texture generation procedure exploits the reconstructed/smoothed geometry in order to compute the colors to be associated with the re-sampled points.

The padding process aims at filling the empty space between patches in order to generate a piecewise smooth image suited for video compression. TMC2v0 uses a simple padding strategy, which proceeds as follows:

Each block of T×T (e.g., 16×16) pixels is processed independently.

If the block is empty (i.e., all its pixels belong to empty space), then the pixels of the block are filled by copying either the last row or column of the previous T×T block in raster order.

If the block is full (i.e., no empty pixels), nothing is done.

If the block has both empty and filled pixels (i.e. a so-called edge block), then the empty pixels are iteratively filled with the average value of their non-empty neighbors.

The padded geometry images and padded texture images may be provided for video compression. The generated images/layers may be stored as video frames and compressed using for example High Efficiency Video Coding (HEVC) Test Model 16 (HM) video codec according to the HM configurations provided as parameters. The video compression also generates reconstructed geometry images to be provided for smoothing, wherein a smoothed geometry is determined based on the reconstructed geometry images and patch info from the patch generation. The smoothed geometry may be provided to texture image generation to adapt the texture images.

The patch may be associated with auxiliary information being encoded/decoded for each patch as metadata. The auxiliary information may comprise index of the projection plane, 2D bounding box, 3D location of the patch represented in terms of depth $\delta 0$, tangential shift s0 and bitangential shift r0.

In the auxiliary patch information compression, the following meta data is encoded/decoded for every patch:

Index of the projection plane
  Index 0 for the normal planes (1.0, 0.0, 0.0) and (−1.0, 0.0, 0.0)
  Index 1 for the normal planes (0.0, 1.0, 0.0) and (0.0, −1.0, 0.0)
  Index 2 for the normal planes (0.0, 0.0, 1.0) and (0.0, 0.0, −1.0).

2D bounding box (u0, v0, u1, v1)

3D location (x0, y0, z0) of the patch represented in terms of depth $\delta 0$, tangential shift s0 and bi-tangential shift r0. According to the chosen projection planes, ($\delta 0$, s0, r0) are computed as follows:
  Index 0, $\delta 0$=x0, s0=z0 and r0=y0
  Index 1, $\delta 0$=y0, s0=z0 and r0=x0
  Index 2, $\delta 0$=z0, s0=x0 and r0=y0

Also, mapping information providing for each T×T block its associated patch index is encoded as follows:

For each T×T block, let L be the ordered list of the indexes of the patches such that their 2D bounding box contains that block. The order in the list is the same as the order used to encode the 2D bounding boxes. L is called the list of candidate patches.

The empty space between patches is considered as a patch and is assigned the special index 0, which is added to the candidate patches list of all the blocks.

Let I be index of the patch to which belongs the current T×T block and let J be the position of I in L. Instead of explicitly encoding the index I, its position J is arithmetically encoded instead, which leads to better compression efficiency.

The occupancy map consists of a binary map that indicates for each cell of the grid whether it belongs to the empty space or to the point cloud. Herein, one cell of the 2D grid produces a pixel during the image generation process. When considering an occupancy map as an image, it may be considered to comprise occupancy patches. Occupancy patches may be considered to have block-aligned edges according to the auxiliary information described in the previous section. An occupancy patch hence comprises occupancy information for a corresponding texture and geometry patches.

The occupancy map compression leverages the auxiliary information described in previous section, in order to detect the empty T×T blocks (i.e., blocks with patch index 0). The remaining blocks are encoded as follows.

The occupancy map could be encoded with a precision of a B0×B0 blocks. B0 is a user-defined parameter. In order to achieve lossless encoding, B0 should be set to 1. In practice B0=2 or B0=4 result in visually acceptable results, while significantly reducing the number of bits required to encode the occupancy map. The generated binary image covers only a single colour plane. However, given the prevalence of 4:2:0 codecs, it may be desirable to extend the image with "neutral" or fixed value chroma planes (e.g. adding chroma planes with all sample values equal to 0 or 128, assuming the use of an 8-bit codec).

The obtained video frame is compressed by using a video codec with lossless coding tool support (e.g., AVC, HEVC RExt, HEVC-SCC).

Occupancy map is simplified by detecting empty and non-empty blocks of resolution T×T in the occupancy map and only for the non-empty blocks we encode their patch index as follows:

A list of candidate patches is created for each T×T block by considering all the patches that contain that block.

The list of candidates is sorted in the reverse order of the patches.

For each block,
  If the list of candidates has one index, then nothing is encoded.
  Otherwise, the index of the patch in this list is arithmetically encoded.

The point cloud geometry reconstruction process exploits the occupancy map information in order to detect the non-empty pixels in the geometry/texture images/layers.

The 3D positions of the points associated with those pixels are computed by levering the auxiliary patch information and the geometry images. More precisely, let P be the point associated with the pixel (u, v) and let ($\delta 0$, s0, r0) be the 3D location of the patch to which it belongs and (u0, v0, u1, v1) its 2D bounding box. P could be expressed in terms of depth $\delta$ (u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v$$

where g(u, v) is the luma component of the geometry image.

The smoothing procedure aims at alleviating potential discontinuities that may arise at the patch boundaries due to compression artifacts. The implemented approach moves boundary points to the centroid of their nearest neighbors.

In the texture reconstruction process, the texture values are directly read from the texture images.

Consequently, V-PCC provides a procedure for compressing a time-varying volumetric scene/object by projecting 3D surfaces onto a number of pre-defined 2D planes, which may then be compressed using regular 2D video compression algorithms. The projection is presented using different patches, where each set of patches may represent a specific object or specific parts of a scene.

While the above description of V-PCC is based on point clouds, V-PCC also provides support for encoding and decoding volumetric data in the form of polygon meshes. A polygon mesh is a collection of vertices, edges and faces that defines the shape of a polyhedral object in 3D computer graphics and solid modelling. The faces usually consist of triangles (triangle mesh), quadrilaterals (quads), or other simple convex polygons (n-gons), since this simplifies rendering, but may also be more generally composed of concave polygons, or even polygons with holes.

Objects created with polygon meshes are represented by different types of elements. These include vertices, edges, faces, polygons and surfaces. In many applications, only vertices, edges and either faces or polygons are stored.

Vertex defines a position, i.e. a point, in a 3D space defined as (x, y, z) along with other information such as color (r, g, b), normal vector and texture coordinates.

Edge is a connection between two vertices, wherein the two vertices are endpoints of the edge.

Face is a closed set of edges, in which a triangle face has three edges, and a quad face has four edges. A polygon is a coplanar set of faces. In systems that support multi-sided faces, polygons and faces are equivalent. Mathematically a polygonal mesh may be considered an unstructured grid, or undirected graph, with additional properties of geometry, shape and topology.

Surfaces, i.e. smoothing groups, may be used to form a discrete representation of the faces. Smoothing groups are useful, but it is not required to group smooth regions.

Some mesh formats contain groups, which define separate elements of the mesh, and are useful for determining separate sub-objects for skeletal animation or separate actors for non-skeletal animation.

Materials are defined to allow different portions of the mesh to use different shaders when rendered.

Most mesh formats also support some form of UV coordinates ("U" and "V" denoting axes of 2D texture) which are a separate 2D representation of the mesh "unfolded" to show what portion of a 2-dimensional texture map to apply to different polygons of the mesh. It is also possible for meshes to contain other such vertex attribute information such as color, tangent vectors, weight maps to control animation, etc. (sometimes also called channels).

Figure 4A:
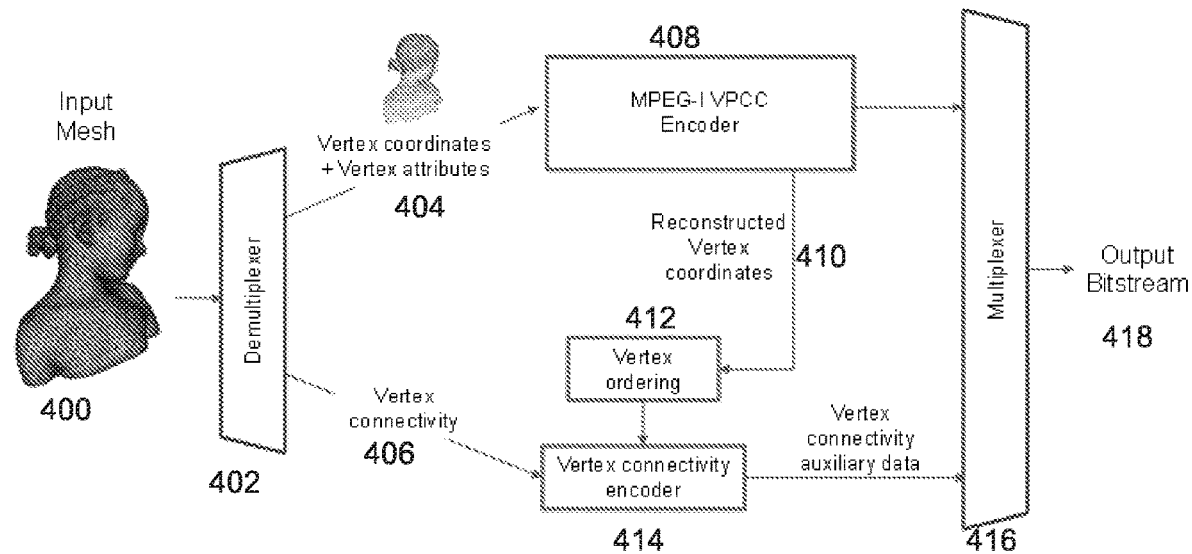
FIGS. 4a and 4b show simplified examples of mesh encoding and decoding extensions to the V-PCC encoder and decoder.
Figure 4B:
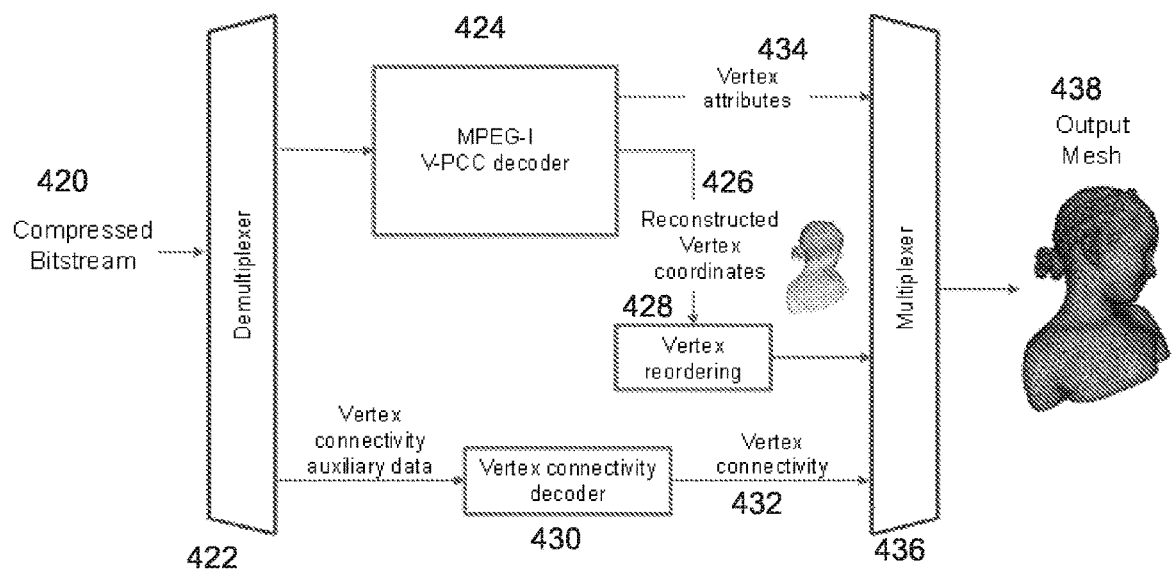

FIGS. 4a and 4b show extensions to the V-PCC encoder and decoder, respectively, to support mesh encoding and mesh decoding, respectively. The extensions to the V-PCC encoder and decoder are disclosed more in detail in the document MPEG M47608.

In the encoder extension, shown in FIG. 4a, the input mesh data 400 is demultiplexed 402 into vertex coordinate+ attributes data 404 and vertex connectivity 406. The vertex coordinate+attributes data 404 is coded using MPEG-I V-PCC 408 (such as shown in FIG. 1), and reconstructed vertex coordinates 410 at the output of MPEG-I V-PCC are provided to vertex ordering 412 for reordering the vertices for optimal vertex connectivity encoding. The vertex connectivity data 406 is coded in vertex connectivity encoder 414 as auxiliary data based on the control data from the vertex ordering 412. The encoded coordinate+attributes data and vertex connectivity are multiplexed 416 to create the final compressed output bitstream 418.

In the decoder, shown in FIG. 4b, the input bitstream 420 is demultiplexed 422 to generate the compressed bitstreams for vertex coordinates+attributes data and vertex connectivity. The vertex coordinates+attributes data is decompressed using MPEG-I V-PCC decoder 424. Vertex reordering 428 is carried out on the reconstructed vertex coordinates 426 at the output of MPEG-I V-PCC decoder 424 to match the vertex order at the encoder. Vertex connectivity data 432 is obtained through decompression in vertex connectivity decoder 430. The decompressed vertex connectivity data 432 and decompressed vertex attribute data 434 are multiplexed 436 to generate the reconstructed mesh 438.

In the mesh coding according to the extensions for V-PCC, as shown in FIGS. 4a and 4b, the vertices are directly mapped to color values in image textures, i.e. each geometry value will have one occupancy value and one color attribute value. The shading (i.e. applying color values to faces of a mesh) is carried out by interpolating color values from the vertices of each triangle.

Using larger number of vertices enables to encode more detailed geometry structure of the object. However, if better compression efficiency is desired by reducing the number of vertices compared to the original mesh, this would lead to loss of texture details, as well.

In the following, an enhanced method for texture mapping in mesh-based rendering for volumetric 3D data will be described in more detail, in accordance with various embodiments.

Figure 5:
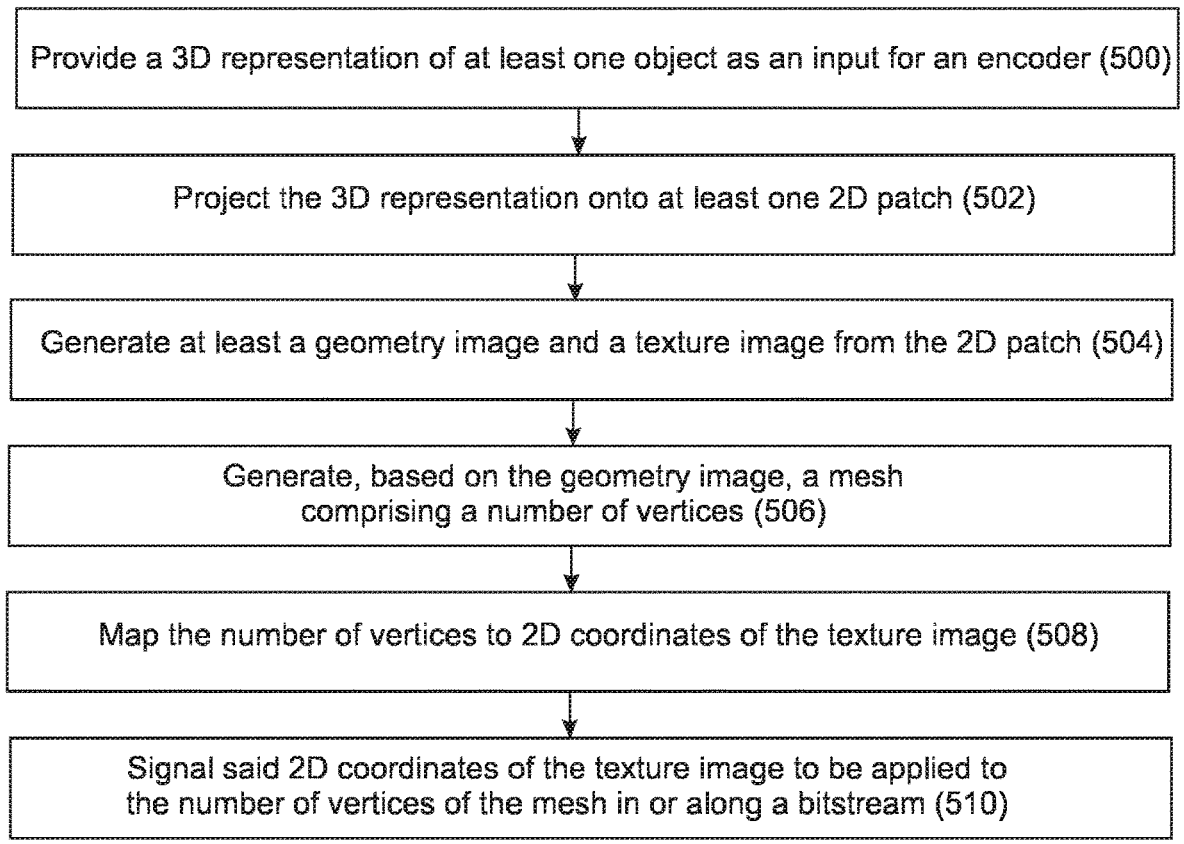
FIG. 5 shows a flow chart for texture mapping in mesh-based rendering according to an embodiment.

The method, which is disclosed in FIG. 5, comprises providing (500) a 3D representation of at least one object as an input for an encoder; projecting (502) the 3D representation onto at least one 2D patch; generating (504) at least a geometry image and a texture image from the 2D patch; generating (506), based on the geometry image, a mesh comprising a number of vertices; mapping (508) the number of vertices to two-dimensional (2D) coordinates of the texture image; and signaling (510) said 2D coordinates of the texture image to be applied to the number of vertices of the mesh in or along a bitstream.

Thus, by mapping the vertices of the mesh to the originally generated texture image, the details of the texture may be preserved while the geometry details may simultaneously be reduced by using a smaller number of vertices. Said mapping thereby decouples the one-to-one mapping of the color and geometry values, but instead applies a mapping the vertices to 2D coordinates, a.k.a. UV coordinates of the originally generated texture image. As a result, improved compression efficiency may be achieved without sacrificing the level of texture details.

According to an embodiment, the method further comprises determining a resolution of the texture image; and determining the number of vertices of the mesh, wherein the ratio between the resolution of the texture image and the number of vertices of the mesh is adjustable. Thus, the V-PCC mesh coding may utilize different resolution texture maps to enable low resolution geometry signalling with high resolution textures.

Consequently, a suitable balance between the number of vertices and the desired texture quality may be searched for. When applying meshes having different numbers of vertices on a texture image of a given resolution, it can be observed that the quality of the rendered patch greatly depends on the number of vertices used: the less vertices are used, the more details are eroded. On the other hand, it should be noted that the rendering complexity increases as the number of the vertices increase, as well as the amount of connectivity information increases as the number of vertices increase. It is thus desirable to find a balance between the number of vertices used and choose acceptable degradation of the texture quality.

It is evident that significant improvements in compression efficiency may be achieved for patches, where the originally generated texture image comprises a high level of details, while the geometry image depicts a rather simple geometrical shape, which can be defined by a mesh having a rather small number of vertices. In current V-PCC mesh coding design, utilization of full quality texture would require signalling vertices for each pixel in texture. According to the embodiments disclosed herein, full quality texture may be utilized with significantly smaller number of vertices, at the simplest even with only 4 vertices, thus resulting in significantly increased rendering performance and quality at virtually zero cost in metadata.

Figure 6A:
FIGS. 6a and 6b show an example illustrating the effect of reducing the number of vertices according to some embodiments.
Figure 6B:
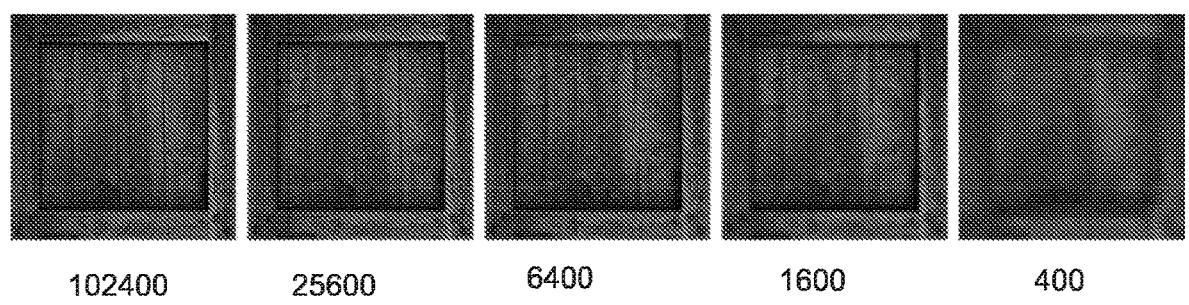

FIGS. 6a and 6b show an example illustrating the effect of reducing the number of vertices. FIG. 6a shows a wooden cube box as an example of a 3D object to be rendered according to the embodiments. One face of the cube box is projected onto a 2D patch, from which at least a geometry image and a texture image are generated. FIG. 6b shows illustrations for different number of vertices per the same face and the resulting rendering approximations according to the embodiments. The number of used vertices, starting from the left-most approximation, are 102400, 25600, 6400, 1600 and 400, respectively. According to the embodiments disclosed herein, full quality texture may be utilized with significantly smaller number of vertices, i.e. enabling quality of texture as seen in FIG. 6a with 102400 vertices per face to be rendered with only 8 vertices.

The mapping between the vertices of the mesh and the 2D coordinates of the texture image are signalled in or along the bitstream comprising the encoded volumetric 3D data. It is noted that the 2D coordinates of the texture image, i.e. the UV coordinates of the texture image, are only used for providing the mapping to the vertices, and they are thereby different from the geometry image vertex coordinates.

According to an embodiment, said 2D coordinates of the texture image to be applied to the number of vertices of the mesh are signaled in metadata structures. The metadata structures may comprise e.g. V-PCC metadata structures or SEI messages. Said signalling may be performed as long as the mapping between the geometry texture and the UV coordinates is maintained.

According to an embodiment, said 2D coordinates of the texture image are signaled as V-PCC metadata structures comprising definitions for calculating 2D texture coordinates from vertex coordinates of the geometry image. Herein, the attribute layout and the geometry layout may be aligned so that proper values of UV coordinates may be mapped for vertices. Accordingly, minimal additional metadata is required for said signaling.

For example, the following equation may be used to find texture coordinates for a vertex based on vertex position (x,y) on a geometry map. It is assumed that the resolution of the geometry map and the texture map, patch size, or tile group size is known. The equation uses such information to calculate texture coordinates (u,v) for any desired vertex position (x,y) either on atlas, inside tile group or inside patch. It is noted that other equations may be used if the texture coordinates should be calculated in a different manner, for example if texture clamping should be used.

$$\frac{vertex(x, y)}{geometry(width, height)} = roundToInteger\left(\frac{texture\_coordinate(u, v)}{texture(width, height)}\right)$$

According to an embodiment, syntax elements, which may be referred to as asps_uv_mapping_flag and asps_uv_mapping_type are added to atlas sequence parameter set in extensions fields or any other suitable syntax structure for ISO/IEC 23090-5 (or similar volumetric video coding technology). Herein, when the value of asps_uv_mapping_flag is equal to 1, it specifies that uv mapping extension is used. The value equal to 0 specifies that the uv mapping is not used. The syntax element asps_uv_mapping_type indicates the type of the uv mapping mechanism. Table 1 shows an example of including said syntax elements into atlas sequence parameter set in extensions fields.

TABLE 1

| | Descriptor |
|---|---|
| atlas_sequence_parameter_set_rbsp( ) { | |
|   asps_atlas_sequence_parameter_set_id | ue(v) |
|   asps_frame_width | u(16) |
|   asps_frame_height | u(16) |
|   asps_log2_patch_packing_block_size | u(3) |
|   asps_log2_max_atlas_frame_order_cnt_lsb_minus4 | ue(v) |
|   asps_max_dec_atlas_frame_buffering_minus1 | ue(v) |
|   asps_long_term_ref_atlas_frames_flag | u(1) |
|   asps_num_ref_atlas_frame_lists_in_asps | ue(v) |
|   for( i = 0; i < asps_num_ref_atlas_frame_lists_in_asps; i++ ) | |
|     ref_list_struct( i ) | |
|   asps_use_eight_orientations_flag | u(1) |
|   asps_45degree_projection_patch_present_flag | u(1) |
|   asps_normal_axis_limits_quantization_enabled_flag | u(1) |
|   asps_normal_axis_max_delta_value_enabled_flag | u(1) |
|   asps_remove_duplicate_point_enabled_flag | u(1) |
|   asps_pixel_deinterleaving_flag | u(1) |
|   asps_patch_precedence_order_flag | u(1) |
|   asps_patch_size_quantizer_present_flag | u(1) |
|   asps_enhanced_occupancy_map_for_depth_flag | u(1) |
|   asps_point_local_reconstruction_enabled_flag | u(1) |
|   asps_map_count_minus1 | u(4) |
|   if( asps_enhanced_occupancy_map_for_depth_flag && asps_map_count minus1 = = 0 ) | |
|     asps_enhanced_occupancy_map_fix_bit_count_minus1 | u(4) |
|   if( asps_point_local_reconstruction_enabled_flag ) | |
|   asps_point_local_reconstruction_information( asps_map_count_minus1 ) | |
|   if( asps_pixel_interleaving_flag | | asps_point_local_reconstruction_enable | |

TABLE 1-continued

| | Descriptor |
|---|---|
| d_flag ) | |
|    asps_surface_thickness_minus1 | u(8) |
|    asps_vui_parameters_present_flag | u(1) |
|    if( asps_vui_parameters_present_flag ) | |
|      vui_parameters( ) | |
|    asps_extension_present_flag | u(1) |
|    if( asps_extension_present_flag) | |
|      asps_uv_mapping_flag | u(1) |
|      if( asps_extension_uv_mapping_flag ){ | |
|         asps_uv_mapping_type | u(8) |
|      } | |
|      while(more_rbsp_data( )) | |
|         asps_extension_data_flag | u(1) |
|    rbsp_trailing_bits( ) | |
| } | |

According to an embodiment, said 2D coordinates of the texture image are signaled in patch metadata. Herein, patch data structures may be used to store UV coordinates for each vertex within the patch. This embodiment provides increased flexibility regarding the layout of the UV coordinates and texture within the patch, thus enabling more efficient use of texture space. The patch-wise layout of geometry and texture atlas will remain the same.

The patch metadata may be used for signaling sub-coordinates within the texture patch for each vertex. Mapping the UV coordinates to vertices may be done by arranging the UV coordinates in scanline vertex order per patch. First (u,v)-pair in UV coordinates list will be applied for the first valid vertex in geometry map (first row and first column).

According to an embodiment, syntax elements, which may be referred to as asps_extension_uv_mapping_flag and uv_coordinates_list are added to patch_data_unit or any other suitable syntax structure for ISO/IEC 23090-5 (or similar volumetric video coding technology). Herein, when the value of asps_extension_uv_mapping_flag is equal to 1, it specifies that uv mapping extension is used. The value equal to 0 specifies that the uv mapping is not used. The structure of syntax element uv_coordinates_list may comprise an indication for the length of the UV coordinate list, and the U and V coordinates of a texture relating to a particular vertex in the patch. Tables 2 and 3 show an example of including said syntax elements into patch_data_unit syntax structure.

TABLE 2

| | Descriptor |
|---|---|
| patch_data_unit( patchIdx ) { | |
|    pdu_2d_pos_x[ patchIdx ] | u(v) |
|    pdu_2d_pos_y[ patchIdx ] | u(v) |
|    pdu_2d_delta_size_x[ patchIdx ] | se(v) |
|    pdu_2d_delta_size_y[ patchIdx ] | se(v) |
|    pdu_3d_pos_x[ patchIdx ] | u(v) |
|    pdu_3d_pos_y[ patchIdx ] | u(v) |
|    pdu_3d_pos_min_z[ patchIdx ] | u(v) |
|    if( asps_normal_axis_max_delta_value_enabled_flag ) | |
|      pdu_3d_pos_delta_max_z[ patchIdx ] | u(v) |
|    pdu_projection_id[ patchIdx ] | u(v) |
|    pdu_orientation_index[ patchIdx ] | u(v) |
|    if( afps_lod_bit_count > 0 ) | |
|      pdu_lod[ patchIdx ] | u(v) |
|    if( asps_point_local_reconstruction_enabled_flag ) | |
|      point_local_reconstruction_data( patchIdx ) | |
|    if( asps_extension_uv_mapping_flag ){ | |
|      uv_coordinates_list( ) | |

TABLE 2-continued

| | Descriptor |
|---|---|
|    } | |
| } | |

TABLE 3

| | Descriptor |
|---|---|
| uv_coordinates_list ( ) { | |
|    length | ue(v) |
|    for(j = 0; j < uvcl_length; j++ ) { | |
|      u_coordinate[ j ] | ue(v) |
|      v_coordinate [ j ] | ue(v) |
|    } | |

According to an embodiment, said 2D coordinates of the texture image are signaled as part of tile group metadata. As a result, the UV coordinates are not limited within the patch coordinates of the texture map, but instead the UV coordinates fall within a tile group. This may be useful for partial streaming of UV coordinates and provides additional flexibility for utilizing texture space more efficiently.

According to an embodiment, syntax elements, which may be referred to as asps_extension_uv_mapping_flag and uv_coordinates_list are added to atlas_frame_tile_information or any other suitable syntax structure for ISO/IEC 23090-5 (or similar volumetric video coding technology). Herein, the ordering of per tile group UV coordinates may be performed in a similar manner as with per patch signalling of UV coordinates above. Table 4 shows an example of including said syntax elements into atlas_frame_tile_information syntax structure. The structure of syntax element uv_coordinates_list as shown in Table 3 may be used herein, as well.

TABLE 4

| | Descriptor |
|---|---|
| atlas_frame_tile_information( ) { | |
|    afti_single_tile_in_atlas_frame_flag | u(1) |
|    if( !afti_single_tile_in_atlas_frame_flag ) { | |
|      afti_uniform_tile_spacing_flag | u(1) |
|      if( afti_uniform_tile_spacing_flag ) { | |
|         afti_tile_cols_width_minus1 | ue(v) |
|         afti_tile_rows_height_minus1 | ue(v) |
|      } else { | |
|         afti_num_tile_columns_minus1 | ue(v) |

TABLE 4-continued

| | Descriptor |
|---|---|
|     afti_num_tile_rows_minus1 | ue(v) |
|     for( i = 0; i < afti_num_tile_columns_minus1; i++ ) | |
|       afti_tile_column_width_minus1[ i ] | ue(v) |
|     for( i = 0; i < afti_num_tile_rows_minus1; i++ ) | |
|       afti_tile_row_height_minus1[ i ] | ue(v) |
| } | |
| afti_single_tile_per_tile_group_flag | u(1) |
| if( !afti_single_tile_per_tile_group_flag ) { | |
|     afti_num_tile_groups_in_atlas_frame_minus1 | ue(v) |
|     for( i = 0; i < | |
| afti_num_tile_groups_in_atlas_frame_minus1 + 1; i++ ) { | |
|       if( i > 0 ) | |
|         afti_top_left_tile_idx[ i ] | u(v) |
|         afti_bottom_right_tile_idx_delta[ i ] | u(v) |
|       } | |
|     } | |
|     afti_signalled_tile_group_ id_flag | u(1) |
|     if( afti_signalled_tile_group_id_flag ) { | |
|       afti_signalled_tile_group_id_length_minus1 | ue(v) |
|       for( i = 0; i < | |
| afti_num_tile_groups_in_atlas_frame_minus1 + 1; i++ ) | |
|         afti_tile_group_id[ i ] | u(v) |
|     } | |
|     if( asps_extension_uv_mapping_flag ) | |
|       for( i = 0; i < | |
| afti_num_tile_groups_in_atlas_frame_minus1 + 1; i++ ) | |
|         uv_coordinates_list( ) | |
|     } | |
| } else { | |
|   if( asps_extension_uv_mapping_flag ) | |
|     uv_coordinates_list( ) | |
| } | |
| } | |

According to an embodiment, said 2D coordinates of the texture image are signaled per atlas. This can be implemented in the embodiment shown in Table 4 by setting the value of afti_single_tile_in_atlas_frame_flag equal to 1. This provides the maximum flexibility for constructing the texture atlas.

According to an embodiment, said 2D coordinates of the texture image are signaled in a separate timed metadata stream. In this case, the UV coordinates may be assigned to vertices based on scanline ordering of the vertices in the geometry texture.

According to an embodiment, said 2D coordinates of the texture image are signaled as an additional attribute for V-PCC bitstream. Thus, instead of providing the signalling as part of metadata, the UV coordinates may be signalled as separate attribute channel, wherein a new attribute type may be added for V-PCC which would allow such signalling. As a result, the texture maps may be tailored specifically for the model in question and used to achieve per pixel accuracy of UV coordinates. This adds a new encoded video component to V-PCC video bitstream, which may be encoded with a lossy, or preferably a lossless compression.

According to an embodiment, a new attribute type, which may be referred to as ATT_UV_MAP, is added to V-PCC attribute type list, where ai_attribute_type_id[j][i] indicates the attribute type of the Attribute Video Data unit with index i for the atlas with index j. Table 5 shows a list of attributes and their relationship with ai_attribute_type_id, where ATT_UV_MAP is added as a new attribute type 5. ATTR_UV_MAP indicates an attribute that contains UV texture coordinates associated with each point in a point cloud.

TABLE 5

| ai_attribute_type_id[ j ][ i ] | Identifier | Attribute type |
|---|---|---|
| 0 | ATTR_TEXTURE | Texture |
| 1 | ATTR_MATERIAL_ID | Material ID |
| 2 | ATTR_TRANSPARENCY | Transparency |
| 3 | ATTR_REFLECTANCE | Reflectance |
| 4 | ATTR_NORMAL | Normals |
| 5 | ATTR_UV_MAP | UV texture coordinates |
| 6 . . . 14 | ATTR_RESERVED | Reserved |
| 15 | ATTR_UNSPECIFIED | Unspecified |

Having, for example, a 4×4 geometry patch, a corresponding UV attribute map ATTR_UV_MAP may consist of a 2-channel 4×4 patch, containing U and V coordinate values for each pixel. Depending on parameter flags in the metadata, these coordinates may refer to UV coordinates in the overall atlas, UV coordinates inside the patch, or UV offsets to apply to UV coordinates calculated from the vertex positions as described earlier.

By default, the UV mapping is applied before accessing the information from the texture atlas. According to an embodiment, a UV attribute map comprising per pixel 2D coordinates of the texture image are configured to be stored on at least two channels of encoded video bitstream. Thus, one or more flags may be included in metadata to enable or disable the UV mapping for different attribute channels. In other words, at least one attribute channel may be used to signal data relevant to the texture domain (after UV mapping), or the vertex domain (before UV mapping).

According to an embodiment, the UV coordinate map is encodable with a plurality of values, each value representing at least one per-pixel property. This enables to encode the UV coordinate map, besides with UV coordinates, but also with pixel validity. This is illustrated by the examples shown in FIGS. 7a-7c.

Figures 7A, 7B, 7C:
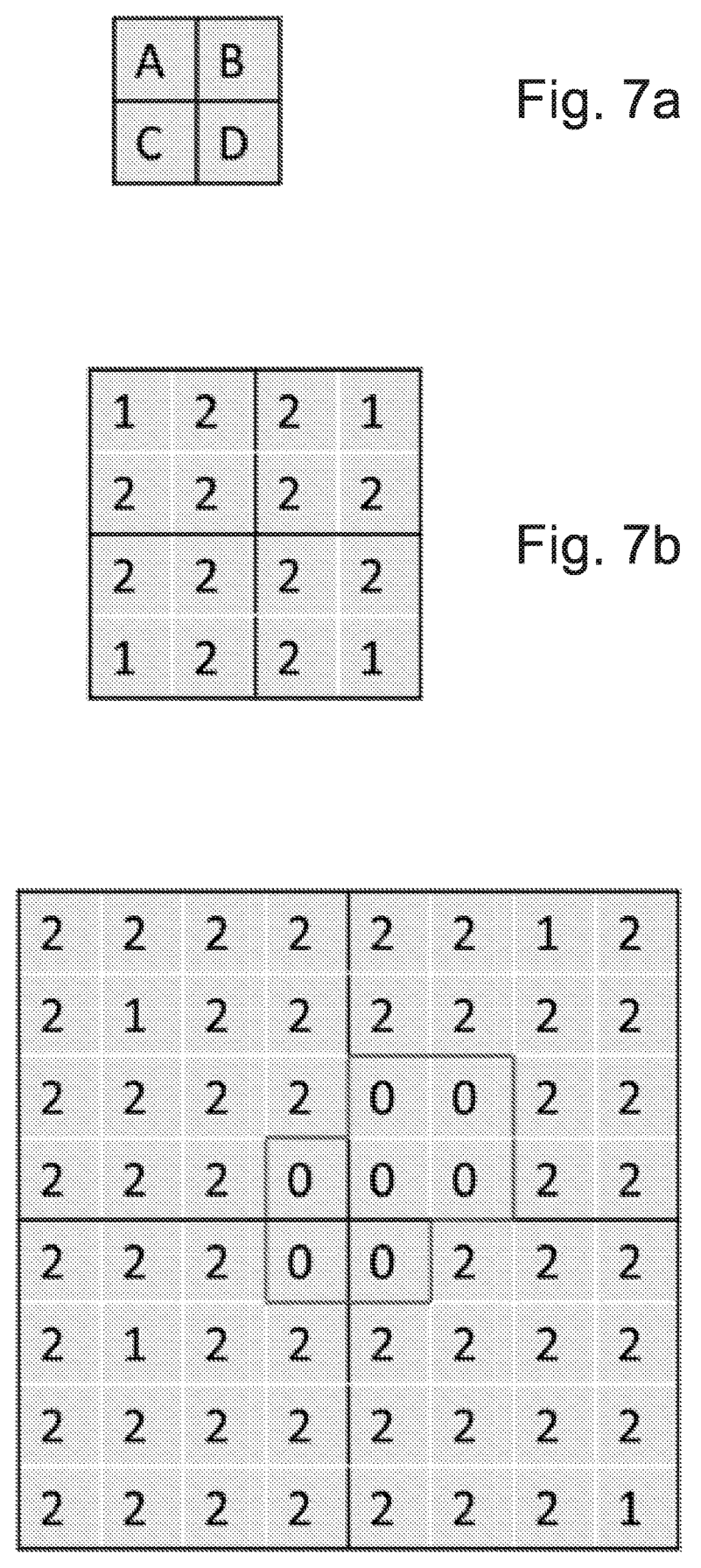

FIG. 7a represents the geometry image where different depth values (A, B, C, D) per pixel are signaled. In practice, this value gives the projected depth of the pixel in 3D domain, which shall be interpreted as the vertex position in space. FIG. 7b represents a UV map, where the value A is mapped to texture coordinates in respective scaled up region. A specific value, e.g. 1, may be assigned to signal valid UV coordinate.

According to an embodiment, at least one value of the UV coordinate map indicates a transparent region. For example, value 0 in UV coordinate map may be reserved for transparency. FIG. 7c shows an example of a transparent region (within the borders) inside a polygon which may be used for fine level of detail or edges.

Similar signalling with different values may be used for other purposes, e.g. for signalling per pixel validity of texture for blending factors, for depth variations etc.

In practice, per vertex UV coordinates may be found from the same scaled up-region of the UV coordinate map. For example, if UV coordinates are signalled at twice the resolution then the UV region per geometry pixel shall be 2×2 as described by black borders in FIGS. 7a-7c.

According to an embodiment, the UV coordinate map is embedded in an occupancy map. In such case, it may be expected that all values in geometry map are valid.

This would also mean that a further different value for UV map should be used for indicating occupancy. This may be implemented e.g. by a specific type signalling indicated in the asps_uv_mapping_type included in atlas sequence parameter set structure, as shown in Table 1.

While V-PCC already supports signalling of different resolution geometry and attributes, the signalling is not performed in an ideal manner for mesh-based rendering. The signalling results in scaling up videos into their nominal resolutions, whereupon scaling up geometry map does not work for mesh-based rendering, because it will result in additional vertices with no connectivity information or texture coordinates.

According to an embodiment, a signal is provided to the decoder for not scaling up one or more of the encoded video component streams. This enables to signal different sizes for geometry image, occupancy map and attribute map in V-PCC.

According to an embodiment, said signaling is performed by a flag in one or more of the following: occupancy information, geometry information, attribute information. For example, for occupancy this type of signaling may be added in occupancy_information(atlasId) by a syntax element, which may be referred to as oi_no_scaling_to_nominal_resolution_flag, wherein the value of 1 indicates that occupancy map should not be scaled to nominal resolution.

|  | Descriptor |
|---|---|
| occupancy_information( atlasId ) { |  |
|   oi_occupancy_codec_id[ atlasId ] | u(8) |
|   oi_lossy_occupancy_map_compression_threshold[ atlasId ] | u(8) |
|   oi_occupancy_nominal_2d_bitdepth_minus1[ atlasId ] | u(5) |
|   oi_no_scaling_to_nominal_resolution_flag | u(1) |
|   oi_occupancy_MSB_align_flag[ atlasId ] | u(1) |
| } |  |

Similarly, geometry_information(atlasId) and attribute_information(atlasId) may be provided with a flag for signalling if they should not be scaled to nominal resolution.

Two or more of the embodiments as described above may be combined, and they may be introduced as one or more indicators in any suitable syntax structure for ISO/IEC 23090-5 (or similar volumetric video coding technology).

Consequently, the embodiments as described herein enable to provide lower rendering complexity and bandwidth requirements with higher level of texture detail. Moreover, the embodiments enable to signal metadata in or along the V-PCC bitstream to flexibly enable use of texture coordinates which are no longer coupled to the geometry texture coordinates.

The embodiments relating to the encoding aspects may be implemented in an apparatus comprising: means for providing a 3D representation of at least one object as an input for an encoder; means for projecting the 3D representation onto at least one 2D patch; means for generating at least a geometry image and a texture image from the 2D patch; means for generating, based on the geometry image, a mesh comprising a number of vertices; means for mapping the number of vertices to two-dimensional (2D) coordinates of the texture image; and means for signaling said 2D coordinates of the texture image to be applied to the number of vertices of the mesh in or along a bitstream.

The embodiments relating to the encoding aspects may likewise be implemented in an apparatus comprising at least one processor and at least one memory, said at least one memory stored with computer program code thereon, the at least one memory and the computer program code configured to, with the at least one processor, cause the apparatus at least to perform: provide a 3D representation of at least one object as an input for an encoder; project the 3D representation onto at least one 2D patch; generate at least a geometry image and a texture image from the 2D patch; generate, based on the geometry image, a mesh comprising a number of vertices; map the number of vertices to two-dimensional (2D) coordinates of the texture image; and signal said 2D coordinates of the texture image to be applied to the number of vertices of the mesh in or along a bitstream.

Such apparatuses may comprise e.g. the functional units disclosed in any of the FIGS. 1a, 1b, 2a, 2b, 4a and 4b for implementing the embodiments.

In the above, some embodiments have been described with reference to encoding. It needs to be understood that said encoding may comprise one or more of the following: encoding source image data into a bitstream, encapsulating the encoded bitstream in a container file and/or in packet(s) or stream(s) of a communication protocol, and announcing or describing the bitstream in a content description, such as the Media Presentation Description (MPD) of ISO/IEC 23009-1 (known as MPEG-DASH) or the IETF Session Description Protocol (SDP). Similarly, some embodiments have been described with reference to decoding. It needs to be understood that said decoding may comprise one or more of the following: decoding image data from a bitstream, decapsulating the bitstream from a container file and/or from packet(s) or stream(s) of a communication protocol, and parsing a content description of the bitstream, In the above, where the example embodiments have been described with reference to an encoder or an encoding method, it needs to be understood that the resulting bitstream and the decoder or the decoding method may have corresponding elements in them. Likewise, where the example embodiments have been described with reference to a decoder, it needs to be understood that the encoder may have structure and/or computer program for generating the bitstream to be decoded by the decoder.

In the above, some embodiments have been described with reference to encoding or decoding texture pictures, geometry pictures, (optionally) attribute pictures and auxiliary patch information into or from a single bitstream. It needs to be understood that embodiments can be similarly realized when encoding or decoding texture pictures, geometry pictures, (optionally) attribute pictures and auxiliary patch information into or from several bitstreams that are associated with each other, e.g. by metadata in a container file or media presentation description for streaming.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. A method comprising:
providing a three-dimensional representation of at least one object as an input for an encoder;
projecting the three-dimensional representation onto at least one two-dimensional patch;
generating at least a geometry image and a texture image from the at least one two-dimensional patch;
generating, based on the geometry image, a mesh comprising a number of vertices;
compressing the mesh comprising the number of vertices;
mapping the compressed number of vertices to two-dimensional coordinates of the texture image, wherein the texture image comprises a different level of compression than the mesh comprising the number of vertices, wherein a resolution of the texture image is different from the compressed number of vertices of the mesh; and
signaling said two-dimensional coordinates of the texture image to be applied to the compressed number of vertices of the mesh in or along a bitstream.

2. The method according to claim 1, further comprising:
determining the resolution of the texture image; and
determining the number of vertices of the mesh, wherein the ratio between the resolution of the texture image and the number of vertices of the mesh is adjustable with the compressing of the mesh, wherein the resolution of the texture image is higher than a resolution of the compressed mesh.

3. The method according to claim 1, wherein said two-dimensional coordinates of the texture image to be applied to the compressed number of vertices of the mesh are configured to be signaled in metadata structures.

4. The method according to claim 3, wherein said two-dimensional coordinates of the texture image are configured to be signaled as video-based point cloud coding metadata structures comprising definitions for calculating two-dimensional texture coordinates from vertex coordinates of the compressed geometry image.

5. The method according to claim 3, wherein the signalling of said two-dimensional coordinates of the texture image to be applied to the compressed number of vertices of the mesh is configured to be carried out with at least two syntax elements, a first syntax element defining whether said mapping is used and a second syntax element defining a type of the mapping.

6. The method according to claim 5, wherein the signalling of said two-dimensional coordinates of the texture image to be applied to the compressed number of vertices of the mesh is configured to be included in an atlas sequence parameter set syntax structure.

7. An apparatus comprising
at least one processor and
at least one memory,
said at least one memory storing instructions that, when executed by the at least one processor, cause the apparatus at least to:
provide a three-dimensional representation of at least one object as an input for an encoder;
project the three-dimensional representation onto at least one two-dimensional patch;
generate at least a geometry image and a texture image from the at least one two-dimensional patch;
generate, based on the geometry image, a mesh comprising a number of vertices;
compress the mesh comprising the number of vertices;
map the compressed number of vertices to two-dimensional coordinates of the texture image, wherein the texture image comprises a different level of compression than the mesh comprising the number of vertices, wherein a resolution of the texture image is different from the compressed number of vertices of the mesh; and
signal said two-dimensional coordinates of the texture image to be applied to the compressed number of vertices of the mesh in or along a bitstream.

8. The apparatus according to claim 7, wherein the at least one memory stores instructions that, when executed by the at least one processor, cause the apparatus to:
determine the resolution of the texture image; and
determine the number of vertices of the mesh, wherein the ratio between the resolution of the texture image and the number of vertices of the mesh is adjustable with the compressing of the mesh.

9. The apparatus according to claim 7, wherein said two-dimensional coordinates of the texture image to be applied to the compressed number of vertices of the mesh are configured to be signaled in metadata structures.

10. The apparatus according to claim 9, wherein said two-dimensional coordinates of the texture image are configured to be signaled as video-based point cloud coding metadata structures comprising definitions for calculating two-dimensional texture coordinates from vertex coordinates of the compressed geometry image.

11. The apparatus according to claim 9, wherein signaling said two-dimensional coordinates of the texture image to be applied to the compressed number of vertices of the mesh comprises the at least one memory storing instructions that, when executed by the at least one processor, cause the apparatus to:
use at least two syntax elements, a first syntax element defining whether said mapping is used and a second syntax element defining a type of the mapping.

12. The apparatus according to claim 11, wherein signaling said two-dimensional coordinates of the texture image to be applied to the compressed number of vertices of the mesh comprises the at least one memory storing instructions that, when executed by the at least one processor, cause the apparatus to:
include said two-dimensional coordinates of the texture image to be applied to the compressed number of vertices of the mesh in an atlas sequence parameter set syntax structure.

13. The apparatus according to claim 9, wherein signaling said two-dimensional coordinates of the texture image to be applied to the compressed number of vertices of the mesh comprises the at least one memory storing instructions that, when executed by the at least one processor, cause the apparatus to:

use at least a first syntax element defining whether said mapping is used and a syntax structure defining a list of mapping types.

14. The apparatus according to claim 13, wherein signaling said two-dimensional coordinates of the texture image to be applied to the compressed number of vertices of the mesh comprises the at least one memory storing instructions that, when executed by the at least one processor, cause the apparatus to:

use a patch metadata or a tile group metadata.

15. The apparatus according to claim 7, wherein said two-dimensional coordinates of the texture image to be applied to the compressed number of vertices of the mesh are configured to be signaled as an additional attribute for encoded volumetric data bitstream.

16. The apparatus according to claim 15, wherein a UV attribute map comprising per pixel two-dimensional coordinates of the texture image are configured to be stored on at least two channels of an encoded video bitstream.

17. The apparatus according to claim 15, wherein a map comprising said two-dimensional coordinates of the texture image to be applied to the compressed number of vertices of the mesh are encodable with a plurality of values, wherein said values represent at least one per-pixel property.

18. The apparatus according to claim 17, wherein said map is configured to be embedded in an occupancy map.

19. The apparatus according to claim 7, wherein the at least one memory stores instructions that, when executed by the at least one processor, cause the apparatus to:

provide a signal to control a decoder not to scale up one or more of encoded video component streams.

20. The apparatus according to claim 19, wherein signaling said two-dimensional coordinates of the texture image to be applied to the compressed number of vertices of the mesh comprises the at least one memory storing instructions that, when executed by the at least one processor, cause the apparatus to:

use a flag in one or more of the following:
    occupancy information;
    geometry information; or
    attribute information.

* * * * *